United States Patent [19]

Chang

[11] Patent Number: 4,974,629

[45] Date of Patent: * Dec. 4, 1990

[54] GAS PRESSURE REGULATOR FOR SAVING RESETTING OPERATION

[76] Inventor: Zong-Shi Chang, P.O. Box 10160, Taipei, Taiwan

[*] Notice: The portion of the term of this patent subsequent to Dec. 4, 2007 has been disclaimed.

[21] Appl. No.: 381,793

[22] Filed: Jul. 19, 1989

[51] Int. Cl.$^5$ .................... F16K 17/34; G05D 16/06
[52] U.S. Cl. .................... 137/460; 137/505.46
[58] Field of Search ............ 137/458, 460, 505.46, 137/505.39

[56] References Cited

U.S. PATENT DOCUMENTS

| 4,067,355 | 1/1978 | St. Clair | 137/458 |
| 4,195,656 | 4/1980 | Kanerva et al. | 137/458 |
| 4,257,448 | 3/1981 | Shiu et al. | 137/460 |
| 4,373,548 | 2/1983 | Chou | 137/460 |
| 4,817,664 | 4/1989 | Chang | 137/456 |

FOREIGN PATENT DOCUMENTS 577674 9/1924 France ............ 137/505.39

Primary Examiner—Stephen M. Hepperle

[57] ABSTRACT

A gas pressure regulator includes a throttle valve provided between a gas inlet passage having an orifice formed therein and a pressure sensing chamber pertaining to a gas exit passage, the throttle valve having a sealing plug fluidically drafted upwardly for closing a truncated cone hole of the throttle valve when subject to a surge gas flow of great volume rate due to a gas leakage from a downstream gas line for safety reason, and gravitationally dropping by a gravity of the plug for re-opening the throttle valve for continuous gas supply when just opening a valve of a gas source.

3 Claims, 2 Drawing Sheets

GAS PRESSURE REGULATOR FOR SAVING RESETTING OPERATION

BACKGROUND OF THE INVENTION

U.S. Pat. No. 4,817,664 granted to the same applicant of this application discloses a switch valve provided in a throttle nozzle between an inlet passage and a pressure sensing chamber containing a diaphragm controlling a lever arrangement. Everytime an exhausted gas line having such a conventional gas pressure regulator is used, a main valve of a gas bottle is opened to cause a suddenly increased gas flow volume through the gas regulator, the switch valve 260 will close the throttle hole 203 which should be re-opened by operating the restoring mechanism 270 for re-use of gas, causing operation inconvenience for the user.

Chuang Jung-chao disclosed a safety controlled valve in his U.S. Pat. No. 4,579,142 which may automatically shut off the gas inlet side 11 by a ball valve 7 once opening a main valve of a gas source for using the gas. After closing the valve 7, it should be restored by operating a cover button 1 to open the valve 7 for reusing the gas, still causing inconvenience for a gas user.

The present inventor has found the drawbacks of my original invention and the prior art such as Chuang's device, and invented the present gas pressure regulator for saving the resetting operation of the throttle valve.

SUMMARY OF THE INVENTION

The object of the present invention is to provide a gas pressure regulator including a throttle valve provided between a gas inlet passage and a gas exit passage, the throttle valve having a sealing plug automatically sealing a throttle hole of the valve when subject to a gas leakage in a gas line, and automatically dropping by its gravity for re-opening the throttle valve for reusing the gas when the gas line has no gas flow and the gas bottle is opened, thereby saving a resetting operation for opening the throttle valve.

DETAILED DESCRIPTION

Figure 1:
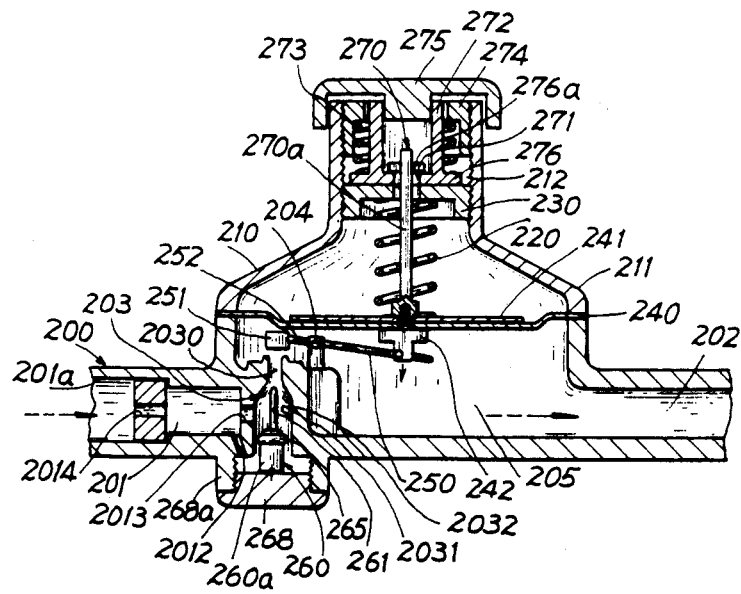
FIG. 1 is a sectional drawing of the present invention showing a gravitational dropping of the plug of the throttle valve having no gas flow in the regulator.

As shown in the drawing figures, the present invention comprises: a main body 200, a cover 210, a compression spring 220, a spring holder 230, a diaphragm 240, a switch lever 250, a throttle valve 203, and a restoring mechanism 270.

The main body 200, the diaphragm 240 and restoring mechanism 270 of this invention is similar to the structure as disclosed in my previously filed U.S. Pat. No. 4,817,664, in which: the diaphragm 240 includes a connecting element 242 connected to a circular-metal plate 241 so as to strengthen the diaphragm 240. The connecting element 242 is connected to one end of the switch lever 250, and the other end 252 is fitted with a sealing member 251. The connecting element 242 is screwed to a rod 270a of restoring mechanism 270.

The restoring mechanism 270 comprises a rod 270a, a sleeve 272, a spring 273, a spring holder 274, a top cover 275 and a retaining element 271. The sleeve 272 is formed a large-diameter disk 276 on its lower end which is formed with a rod hole 276a for reciprocatively moving the rod 270a. The hole 276a is smaller than a lateral length of the retaining element 271. On assembly the sleeve 272 is inserted through a threaded hole 212 in the top cover of the body 200 for upwardly pulling the retaining element 271 which is fastened to the tip of the rod and operatively carried by the disk 276. When the sleeve 272 rises because of external force, the rod will also rise but when the sleeve drops, the rod will not be affected. The spring 273 is inserted around the sleeve 272 and the spring holder 274 is screwed into the top cover of the body 200 through the threaded hole 212. The lower end of the spring 273 bears against the top of the large diameter disk 276 formed on a lower end of the sleeve 272 and the upper end of the spring 273 bears against a protruding part of the spring holder 274. The top cover 275 is connected to the sleeve 272. When the top cover 275 is pulled, the sleeve 272 acts on the retaining element 271 on the rod to cause the rod 270a to rise to a limit set by the spring holder 274.

The switch lever 250 is pivotally mounted on a pivot axle 204 formed on a valve body 203a of the throttle valve 203. The throttle valve 203 is defined between a gas inlet passage 201 and a pressure sensing chamber 205 adjacent to a gas exit passage 202.

The throttle valve 203 of the present invention includes: a valve body 203a generally cylindrical shaped, a throttle seat 203b formed on a top portion of an upper throttle hole 2030 operatively sealed by the sealing member 251 of the switch lever 250, a vertical cylindrical bore 2031 formed in a central portion of the valve body 203a, a truncated cone hole 2032 formed between the cylindrical bore 2031 and the upper throttle hole 2030, a bottom chamber 2033 formed in a lower portion of the valve body 203a under the cylindrical bore 2031 sealed by a bottom cap 268 encapped on a bottom portion of the main body 200, a side entrance hole 2013 formed in a side wall of the valve body 203a communicated with the vertical cylindrical bore 2031 and the inlet passage 201, a bottom drafting hole 2012 formed in a lower portion of the valve body 203a communicated with the bottom chamber 2033 and the gas inlet passage 201, and a sealing plug 260 movably held inside the valve body 203a and operatively sealing the throttle valve 203 or gravitationally resting on the bottom cap 268.

An orifice 2014 is formed between a gas inlet pipe 201a connected to a gas bottle (not shown) and the gas inlet passage 201. The diameter of the orifice 2014 is smaller than the diameter of the side entrance hole 2013. The diameter of the bottom drafting hole 2012 is also smaller than that of the side entrance hole 2013. The upper throttle hole 2030 is smaller in diameter than the vertical bore 2031. The bore 2031 is tapered upwardly to connect the upper hole 2030 through the truncated cone hole 2032. The diameter of the bottom chamber 2033 is larger than that of the bore 2031.

The sealing plug 260 includes: a cylindrical float 260a having a diameter slightly smaller than that of the cylindrical bore 2031, a needle 261 protruding upwardly from the float 260a operatively defining an annular aperature between the needle 261 and the upper throat hole 2030 when the float is fluidically drafted upwardly, and a packing ring 265 disposed on a neck portion between the needle 261 and the float 260a. The weight of plug 260 is designed to cause a gravitational falling down of the plug when there is no fluid flowing through the gas regulator of this invention. However, the plug 260 is fluidically drafted upwardly overcoming its gravity when the gas flows through the upper throttle hole 2030 of the throttle valve 203 due to an increased pressure difference and fluid velocity of the gas across the bore portion inside the valve body 203a and the pressure-sensing chamber 205, which chamber 205 is designed for normally reducing the gas pressure from the inlet passage 201 towards the exit passage 202. The sealing plug 260 has a longitudinal axis generally perpendicular to a longitudinal axis of the inlet passage 201.

In operating the present invention under a condition of no fluid flow as shown in FIG. 1, the gravity of the plug 260 will make it to drop to rest on the bottom cap 268 and the compression spring 220 biases the diaphragm 240 downwardly to lift the left sealing member 251 of the switch lever 250 upwardly.

Figure 2:
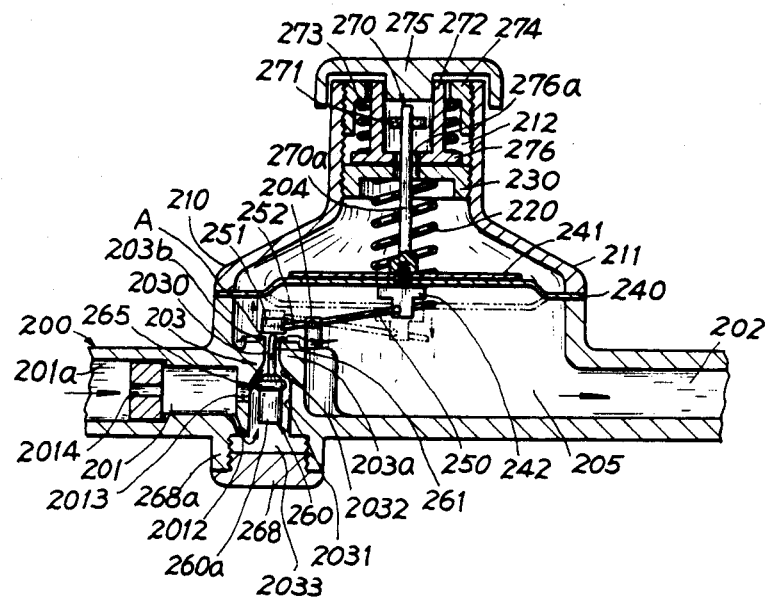
FIG. 2 shows a normal gas flow through the regulator in accordance with the present invention.

When a main valve of the gas bottle is opened, the gas will enter the gas regulator 200 through the orifice 2014, the side hole 2013 and the bottom hole 2012 to pass through bore portion 2031, throttle hole 2030 towards the pressure-sensing chamber (or pressure-reducing chamber) 205. The pressure in chamber 205 will then force the diaphragm 240 upwardly to bias the sealing member 251 downwardly, tending to close the valve 203. However, since the side hole 2013 is larger in diameter than the bottom hole 2012, a major gas stream is flowing through the side hole 2013 and a minor steam flowing through the bottom hole 2012. The gas flow from the wider bore 2031 towards the narrower upper throttle hole 2030 will develop a pressure drop thereacross and may increase a flow velocity of the gas stream to fluidically draft the float 260a upwardly to extend the needle 261 upwardly. If the downstream gas is used to reduce the pressure in chamber 205, the spring 220 will bias the diaphragm 240 downwardly to lift the left sealing member 251, and the upwardly moving needle 261 will form an aperature A between the member 251 and the throttle seat 203b to flow the gas stream towards the exit passage 202 for normal gas supply use as shown in FIG. 2.

Figure 3:
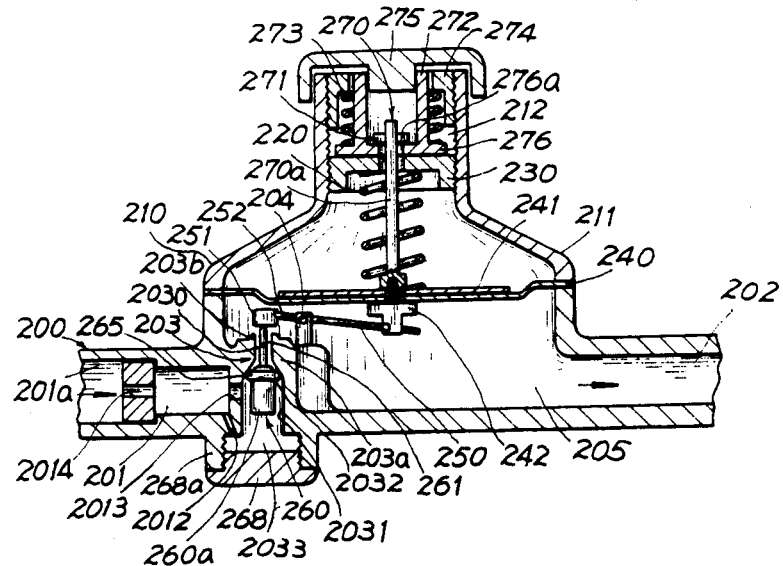
FIG. 3 is an illustration showing a closing throttle valve of the present invention when the gas line is subject to a gas leakage.

During the gas supply service, if there is a gas leakage caused in a broken gas line, a suddenly increased gas volume flowing through the holes 2012, 2013, bore 2031 and the throttle hole 2030 will develop a greater pressure drop across the valve 203 to increase the gas flow velocity to further draft the float 260a upwardly and the sealing member 251 is biased upwardly by a reduced pressure in chamber 205 without obstructing the upward movement of the needle 261 until the packing ring 265 on the plug 260 circumferentially seals the truncated cone hole 2032 as shown in FIG. 3. The throttle valve 203 is now closed to prevent a continuous gas flow towards a downstream broken area for safety purpose.

After the broken or damaged gas line is repaired, the plug 260 will be lowered by pulling the cover 275 upwardly to lower the member 251 to depress the needle 261 for opening the valve 203 and the gas regulator may be ready for next service for a normal gas supply use.

The orifice 2014 of the present invention is provided to reduce the gas pressure entering the inlet passage 201. By selecting the diameter of the orifice 2014, the gas pressure and velocity across the holes 2012, 2013 can be adjusted for ensuring a partial gas stream passing through the throttle hole 2030 into the pressure-sensing chamber 205 before upwardly drafting the float 260a for closing the hole 2032. As provided with such an orifice 2014, the truncated cone hole 2032 of the present invention will not be falsely closed if the gas supplied from the gas bottle exerts a very high pressure of a surge flow of larger volume because the orifice 2014 serves as a buffer for throttling inlet gas pressure and volume, preventing an unexpected closing of the throttle valve 203.

The present invention is superior to a conventional gas regulator by providing a gravitationally openable throttle valve 203 for saving a resetting operation of a restoring mechanism as disclosed in U.S. Pat. No. 4,817,664 and 4,579,142, when the gas line has no gas flow and a main valve of a gas source or a gas bottle is opened.

Figure 4:
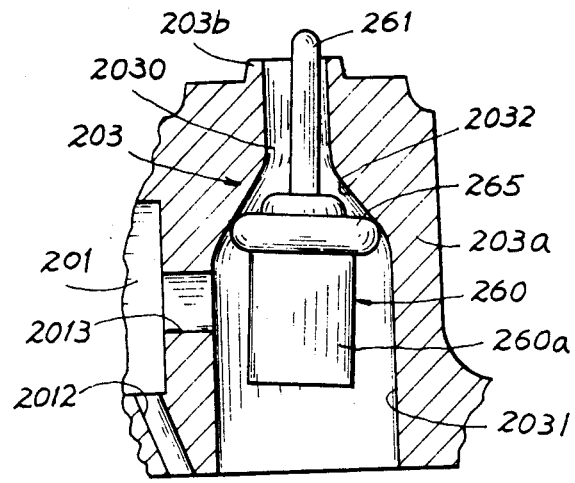
FIG. 4 shows another operation situation of the throttle valve of the present invention.

In practical operation, even the float 260a of the sealing plug 260 may encounter a turbulent gas flow to inclinedly draft the float 260a upwardly (rather than an exact vertical movement), the packing ring 265 may still have an ellipse contact on the bore of the truncated cone hole 2032 to well seal the throttle hole 2030 if the gas line is broken as shown in FIG. 4.

I claim:
1. A gas pressure regulator comprising:
a main body having a gas inlet passage formed with an orifice beyond the inlet passage, a gas exit passage, and a pressure sensing chamber containing a spring biased diaphragm, a throttle valve connecting the inlet passage to the pressure sensing chamber;
a switch lever pivotally secured on a valve body of said throttle valve having its one end connected with a sealing member;
a restoring mechanism including a rod coupled to said diaphragm,
a compression spring jacketed on said rod normally urging said diaphragm to downwardly bias one end of said switch lever so as to lift the other end of said lever secured with said sealing member;
said throttle valve including the valve body formed between said inlet passage and said pressure-sensing chamber, and a sealing plug movable held inside the valve body for operatively sealing the throttle valve;
said valve body of said throttle valve having a vertical cylindrical bore formed in a middle portion of the valve body, an upper throttle hole tapered upwardly from said cylindrical bore forming a truncated cone hole between the throttle hole and the cylindrical bore, a bottom chamber formed under the cylindrical bore covered by a bottom cap formed on a bottom portion of said main body, a side entrance hole transversely formed in a middle portion of the valve body communicated with the cylindrical bore and communicated with the inlet passage, and a bottom drafting hole formed in a lower portion of the valve body communicated with said bottom chamber and said inlet passage; and
said sealing plug including a cylindrical float movably held in said vertical cylindrical bore, a needle protruding upwardly from said float and a packing ring formed between said needle and said float, an annular aperature defined between said needle of said sealing plug and said upper throttle hole, said float having a diameter larger than a diameter of said needle but slightly smaller than an inside diameter of the vertical cylindrical bore, whereby upon a surge gas flow of increased volume through the gas regulator, the gas flowing through the throttle valve will exert a pressure drop and increase flow velocity to thereby draft the float upwardly to extend the needle of the sealing plug upwardly to allow the packing ring of the plug sealing the truncated cone hole for closing the throttle valve for safety purpose.

2. A gas pressure regulator according to claim 1, wherein said bottom drafting hole of said throttle valve has a diameter smaller than a diameter of said side entrance hole.

3. A gas pressure regulator according to claim 1, wherein said orifice beyond said inlet passage has a diameter smaller than a diameter of said side entrance hole of the throttle valve.

* * * * *